Patented June 24, 1930

1,766,892

UNITED STATES PATENT OFFICE

HARRY C. FISHER, OF CINCINNATI, OHIO, ASSIGNOR, BY MESNE ASSIGNMENTS, TO THE PHILIP CAREY MANUFACTURING COMPANY, A CORPORATION OF OHIO

COLORING MINERAL GRANULES

No Drawing. Application filed May 14, 1926. Serial No. 109,175.

My invention relates to processes of permanently coloring granules of mineral material, particularly slate granules, by a process which utilizes colloidal jels for a penetrative vehicle to give permanent coloring to the surface of slate or other mineral granules, and which in making the jells, and imparting color thereto, employs an acid treatment of the granules themselves, to provide final oxides which give the required color coating.

I have heretofore proposed permanently coloring slate granules by imposing thereon a dichromate, and sulphate of iron compound, which when heat is applied, pass first through a stage of an hydroxide jell, having the consistency of liver, and then are converted into oxides, which impart a permanent color to the granules. During this progressive reaction the coating materials penetrate the surface of the slate granules, and impart a permanent color thereto which depends for its tone, anywhere between red to yellow to chocolate brown, upon the heat and the nature of the atmosphere maintained during the reaction.

My present process is directed specifically toward the production of a rich brown of a light walnut hue, in granular slate, without the use of iron salts, except as same are formed in an acid treatment of the mineral granules. The dichromate is employed to give the peculiar penetrative quality, but the color depends upon the acid treatment.

Among other constituents adapted to be attacked by acid, slate granules contain a quantity of the mineral chlorite which is a hydrated aluminum, magnesium, and iron silicate. The action thereon of sulphuric acid is not definitely known, but it is apparent that particularly in the hot zone of a progressive kiln, the chlorite is attached and destroyed, and sulphates of the metals present are formed. The important one of these in forming the browns which I desire to produce are the iron sulphates.

Also, sodium dichromate in solution is used, which itself is apparently attacked by the acid, liberating chromic acid which has a powerful oxidizing effect and which, among other actions, will tend to oxidize any free oxides present. Thus any FeO present will be converted into $Fe_2O_3$.

The action of the acid and dichromate treatment is twofold, broadly:—it destroys the original green color of the slate largely through the decomposition of chlorite, and it liberates iron compounds and adapts them for the formation of pigments through their conversion to $Fe_2O_3$. The natural color of $Fe_2O_3$ is red, but the color desired in my finished slate product is a light brown, more yellowish than red. When $Fe_2O_3$ is formed under conditions which produce it in a state of extremely minute subdivision, it is yellowish rather than red color. These conditions are usually colloidal in character, and I have observed that if $Fe_2O_3$ is formed from a colloidal iron compound, e. g., a jell of hydroxide of iron, it is formed in the desired state of fineness. The same results, however, appear to be produced by the presence, during the pigment-forming step, of calcium and aluminum compounds which are liberated by the acid treatment, and while I do not wish to be limited by the theories above outline, I believe that herein lies a third action of the acid treatment. I unquestionably get iron pigments of the forumla $Fe_2O_3$ which tend to the yellow rather than the red, and I believe their formation to be due in part to the production of a small portion of them from jell-like hydroxides and in part to the presence of calcium and aluminum compounds which appear to be peptizing agents during the formation of the rest.

Thus, the broader aspects of the process include the forming of jells on the surface of minerals with or without the assistance of peptizing agents. These reactions appear to result from the acid treatment of the chlorites or coloring matter in the mineral treated. The process is particularly effective in the production of browns on slat granules wherein peptizing agents, such as the calcium and aluminum salts appear to form in connection with the oxidization of the iron salts bring them to a state of minute subdivision, which gives browns and yellows instead of reds. Also the production of pigments from jells results in an appreciable penetration of the pigment-forming materials beneath the surface of the slate, so that the pigments themselves do not form a coating only upon the surface. In the present case it will be observed that to a degree this same action will take place; and while both jell formation and penetration occur to comparatively only a slight degree, nevertheless the action is sufficient to stabilize the entire coloring process with reference to the final product, and to this function of the dichromate, in connection with iron salts formed by the acid reaction, I attach considerable importance. If I desire to increase the penetration, I may add more dichromate, which in combination with more of the ferrous sulphate liberated in the acid treatment, will form more of the penetrative jell. I may also, however, form a portion of the penetrative jell entirely from substances superadded to the slate, as by adding a quantity of ferrous sulphate to the sodium dichromate solution.

The process in its broader aspects will be understood from a description of the particular mode of procedure, whereby I form a "weathered" brown slate in granular form.

The mechanisms used in my own commercial practice are mixers for wetting the slate granules with the solutions employed, and a rotary kiln through which the materials pass progressively, with agitation to prevent balling up. The prime objective is the production of brown slate granules with the least possible expense.

I place say 2000 pounds of granulated slate into an acidulator and add first a solution of two pounds of sodium dichromate ($Na_2Cr_2O_7 \cdot 2H_2O$) in two gallons of water, and mix thoroughly. If the slate was originally dry, there should then be added enough water to bring up the content of the mass to around nine and one-half gallons. The moisture content of the slate must be determined in provision for this part of the process.

Next I add in the acidulator 151.4 pounds of commercial 66 Baumé sulphuric acid, as rapidly as possible (two minutes or less) and stir it for ten or fifteen minutes. The time taken for adding the acid and mixing it in is important for getting a sufficient action. The best guide which I can give for various quantities in the batch of slate, and various types of equipment, is to follow the above instructions or else to try various practices, as to which it will be found that if too long a time of subjection of the material to chemical reaction before treating in the kiln has been employed, the finished product will be too red and dusty, and if too short a treatment has been imparted, there will be an insufficient depth of color, and the undercoat of kilned slate granules will be insufficiently covered, making the finished product spotty. The use of too little acid will give a friable or dusty product, and the use of the acid and dischromate together in a solution, or use of the acid first will not give proper penetration. The proportion of dichromate to acid if varied so as to increase it, will give a deep or reddish brown, and a decrease in the dichromate will cut down the jell forming reaction giving unsuitable penetration.

When the slate is ready for the kiln, it is passed with agitation to prevent balling up, with the material brought to around 1200 Fahrenheit, through a rotary kiln of any desired type.

The atmosphere to produce the true light walnut or "weathered" brown color which I have chosen as standard in my work, should be oxidizing, but can be adjusted to control the shade of color. The hotter the slate is made, the redder will be the color, and insufficient heat will result in the acid remaining in small quantities in the finished product, whereas with the high temperatures noted the acid is all decomposed.

As to chemical reactions taking place in the particular process described for making walnut brown slate, it should be noted that at the high temperatures used, the acid reacts with all the constituents of slate except the quartz and magnetite, forming sulphates of which sulphates of iron and alumina predominate, with the dichromate broken down to chromic acid, and sulphate, the acid having a very strongly oxidizing character. As the kiln treatment subjects the materials to high heat, the sulphates are broken down into oxides.

During the stage of breaking down, a jell is formed, due to the presence of the dichromate and the sulphates of iron. Certain of the other metallic sulphates appear to act on the iron during the reaction as peptizing agent to cause it to assume the yellow instead of the red form.

The process is one of conversion of the surface of the granules into products which are chemically changed and re-deposited thereon in a partially penetrative form, which is very resistant under conditions of later subjection to the weather.

From a description of my typical process it will be evident that there are certain characteristics thereof which will be applicable to different substances, obtaining colors on mineral granules, particularly slate granules, which are attractive and permanent.

The process has the advantage that the operator can match old colors by taking out test batches, and comparing them with a sample, and changing the fuel input or heat in the kiln, and also controlling the atmosphere.

I believe myself to be the first discoverer of the result of converting the surface of mineral granules into salts convertible into oxides in the presence of a superadded substance having the property of sodium dichromate of forming jells during the stage of conversion into oxides.

Having thus described my invention, what I claim as new and desire to secure by Letters Patent is:

1. A process for coloring slate which consists in treating slate in a granular or crushed condition with an acid, thus converting a portion of the ingredients of said mineral matter into salts convertible into oxides, said mineral matter being treated concurrently with a chromic salt which under a subsequent heat treatment will pass through a jell stage prior to an oxide-forming stage, and then heat treating the said substances to cause them to pass through said jell stage and into said oxide-forming stage.

2. A process for coloring granulated slate which consists in treating slate with an acid, thus converting a portion of the ingredients of said slate into salts convertible into oxides, said slate being treated concurrently with a chromic salt which under subsequent heat treatment will pass through a jell stage prior to an oxide-forming stage, and finally heat treating the said substances with agitation, to cause them to pass through said jell stage and into said oxide-forming stage.

3. A process for coloring granulated slate which consists in treating slate with an acid, thus converting a portion of the ingredients of said slate into salts convertible into oxides, said slate being treated concurrently with a chromic salt which under subsequent heat treatment will pass through a jell stage prior to an oxide-forming stage, and finally heat treating the said substances with agitation, said heat being at a high enough temperature to cause dissipation of all of the acid in the final dry product.

4. A process for coloring granulated slate which consists in treating slate with an acid, thus converting a portion of the same into salts convertible into oxides, concurrently treating said matter with dichromate solution, and finally heating the said treated matter with agitation to convert said salts at least in part into oxides.

5. A process for coloring granulated mineral matter which consists in treating said matter with an acid, thus converting a portion of the same into salts convertible into oxides, concurrently treating said matter with dichromate solution, and finally heating the said treated matter with agitation, the temperature of said material being raised to a minimum or around 1100 degrees Fahrenheit.

6. A process for coloring granulated slate which consists in treating said slate with sulphuric acid solution, and concurrently treating it with dichromate, and finally heating the treated matter to a minimum of around 1100 degrees Fahrenheit.

7. A process for coloring slate granules which consists in forming sulphates at the surface of said granules by treatment of ingredients in the slate with an acid, in the presence of a solution containing a chromic salt which will form a jell with the said sulphates during reduction to oxide form thereof by heat, and finally heat treating said granules to effect a reduction to oxides of the substances thereon.

8. A process for coloring granular mineral matter which consists in treating said mineral matter with a solution comprising a metallic compound which can be caused to pass through a jell stage prior to its conversion to an oxide by heat, treating the granules with an acid solution, and finally heat treating the granules with agitation to a temperature minimum of 1100 degrees Fahrenheit.

9. A process for coloring granular slate which consists in first treating said slate with a dichromate solution, then adding an acid and mixing as described, and finally heating and agitating the resultant product to form oxides of the resultant products of the reaction.

10. A process for making brown granular slate which consists in first treating said slate with a dichromate solution, then adding a solution of sulphuric acid, mixing the products, and finally heating the products with agitation to the extent necessary to reduce the products of the reaction to oxides and to dryness.

11. That process of forming brown slate granules which consists in treating said slate granules in proportions of substantially the ratio of the following: 2000 pounds of dry granulated slate, 2 pounds of sodium dichromate, and 80 pounds of water, then adding 151 pounds of commercial 66° Baumé sulphuric acid, stirring for a period just sufficient to permit chemical reaction with the surface of the granules, and finally heating said substances with agitation to a temperature of between 1100 and 1600 degrees Fahrenheit.

12. A process for coloring granular slate which consists in treating slate granules with acid to form acid salts of metals already present in said mineral, all of said salts being decomposable by heat into oxides, some at least of which are pigments, and at least one of said salts adapted to act as a peptizing agent, adding a substance adapted by reaction with at least one of said salts to form a penetrative jell, then converting at least a portion of said salts to said oxides by heat.

HARRY C. FISHER.